(12) United States Patent
Endoh et al.

(10) Patent No.: US 9,664,821 B2
(45) Date of Patent: May 30, 2017

(54) OPTICAL ELEMENT AND METHOD FOR MANUFACTURING MASTER FOR PRODUCING OPTICAL ELEMENT

(75) Inventors: Sohmei Endoh, Miyagi (JP); Kazuya Hayashibe, Saitama (JP); Tooru Nagai, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 12/252,913

(22) Filed: Oct. 16, 2008

(65) Prior Publication Data
US 2009/0135491 A1    May 28, 2009

(30) Foreign Application Priority Data
Oct. 30, 2007 (JP) .................................. 2007-282117

(51) Int. Cl.
| | |
|---|---|
| G02B 5/04 | (2006.01) |
| G02B 3/00 | (2006.01) |
| G02B 5/02 | (2006.01) |
| B29D 11/00 | (2006.01) |

(52) U.S. Cl.
CPC ...... *G02B 3/0012* (2013.01); *B29D 11/00365* (2013.01); *G02B 5/0231* (2013.01); *G02B 5/045* (2013.01)

(58) Field of Classification Search
CPC ... G02B 1/10; G02B 1/11; G02B 1/12; G02B 5/00; G02B 5/02; G02B 5/021; G02B 5/0215; G02B 5/0221; G02B 5/0231; G02B 5/04; G02B 5/045

USPC ................................. 359/599, 601, 831–837
See application file for complete search history.

(56) References Cited

U.S. PATENT DOCUMENTS

| | | | |
|---|---|---|---|
| 5,177,637 A * | 1/1993 | Tsukada .......................... 359/599 |
| 5,584,556 A * | 12/1996 | Yokoyama et al. ........... 362/625 |
| 6,677,703 B2 * | 1/2004 | Ito et al. ........................ 313/478 |
| 6,997,595 B2 * | 2/2006 | Mi et al. ........................ 362/626 |
| 7,090,389 B2 * | 8/2006 | Parker et al. .................. 362/627 |
| 7,094,452 B2 * | 8/2006 | Yamashita et al. ............. 428/1.3 |
| 7,239,448 B2 | 7/2007 | Yoshikawa et al. |
| 7,633,045 B2 * | 12/2009 | Endoh et al. .................. 250/216 |
| 7,697,205 B2 * | 4/2010 | Noguchi et al. ............... 359/580 |
| 2002/0135847 A1 | 9/2002 | Nagasaka et al. |
| 2003/0011315 A1 | 1/2003 | Ito et al. |
| 2003/0102286 A1 * | 6/2003 | Takahara et al. ............... 216/45 |

(Continued)

FOREIGN PATENT DOCUMENTS

| | | |
|---|---|---|
| JP | 2003-004916 | 1/2003 |
| JP | 2003-131390 | 5/2003 |

(Continued)

OTHER PUBLICATIONS

Hiroshi, T., "Optical and Electro-optical Engineering Contact," vol. 43, pp. 630-637, 2005.

(Continued)

*Primary Examiner* — Thong Nguyen
(74) *Attorney, Agent, or Firm* — Oliff PLC

(57) ABSTRACT

An optical element has a plurality of structures including convex portions or concave portions arranged on a base member surface, wherein the arrangement pitch of the structures is 380 nm to 680 nm and the aspect ratio of the structure is 0.62 to 1.09.

10 Claims, 18 Drawing Sheets

(56) References Cited

U.S. PATENT DOCUMENTS

| | | | |
|---|---|---|---|
| 2003/0169386 A1* | 9/2003 | Goto | G02B 5/08 349/65 |
| 2004/0125592 A1* | 7/2004 | Nagakubo et al. | 362/31 |
| 2004/0253413 A1* | 12/2004 | Baba et al. | 428/141 |
| 2005/0074576 A1 | 4/2005 | Chaiken et al. | |
| 2005/0088746 A1* | 4/2005 | Yoshikawa et al. | 359/569 |
| 2006/0221633 A1* | 10/2006 | Yamauchi | 362/606 |
| 2007/0242475 A1* | 10/2007 | Minobe et al. | 362/608 |
| 2008/0107868 A1* | 5/2008 | Kuroda et al. | 428/141 |
| 2008/0123193 A1* | 5/2008 | Hsu et al. | 359/599 |
| 2008/0129931 A1* | 6/2008 | Takahashi et al. | 349/96 |
| 2009/0323189 A1* | 12/2009 | Taniguchi | 359/599 |

FOREIGN PATENT DOCUMENTS

| | | |
|---|---|---|
| JP | 2003-240904 | 8/2003 |
| JP | 2003-294910 | 10/2003 |
| JP | 2003-322705 | 11/2003 |
| JP | 2004-317922 | 11/2004 |
| JP | 2005-031538 | 2/2005 |
| JP | 2006-038928 | 2/2006 |
| JP | A-2007-090656 | 4/2007 |
| JP | 2007-256340 | 10/2007 |
| WO | WO 2006/064693 A1 | 6/2006 |

OTHER PUBLICATIONS

Mar. 1, 2013 Office Action issued in Chinese Application No. 200810173034.5 (with English translation).

Chinese Patent Office, Notification of the Fifth Office Action mailed Aug. 28, 2012 in Chinese Patent Application No. 200810173034.5 w/English-language Translation.

Sep. 17, 2013 Decision on Rejection issued in Chinese Patent Application No. 200810173034.5 (with English Translation).

Apr. 20, 2016 Office Action issued in Chinese Patent Application No. 200810173034.5.

Oct. 10, 2015 Office Action issued in Chinese Patent Application No. 200810173034.5.

* cited by examiner

PRIOR ART

PRIOR ART

OPTICAL ELEMENT AND METHOD FOR MANUFACTURING MASTER FOR PRODUCING OPTICAL ELEMENT

CROSS REFERENCES TO RELATED APPLICATIONS

The present application claims priority to Japanese Patent Application JP 2007-282117 filed in the Japanese Patent Office on Oct. 30, 2007, the entire contents of which is incorporated herein by reference.

BACKGROUND

The present application relates to an optical element and a method for manufacturing a master for producing an optical element. In particular, the present application relates to an optical element in which a plurality of structures including convex portions or concave portions are arranged on a base member surface.

In related art, regarding an optical element including a light-transmissive substrate, e.g., glass or plastic, a method in which fine, dense concave and convex (sub-wavelength structure; moth-eye) shapes are disposed on an optical element surface is mentioned as a method for reducing light due to surface reflection so as to improve a transmission characteristic. In general, in the case where a periodic concave and convex shape is disposed on an optical element surface, diffraction occurs when light pass through the concave and convex shape, and a straight-ahead component of the transmitted light is reduced significantly. However, diffraction does not occur in the case where the pitch of the concave and convex shape is smaller than the wavelength of the light to be transmitted. For example, in the case where the concave and convex shape is conical, an effective antireflection effect and excellent transmission characteristic can be obtained with respect to light with a single wavelength in accordance with the pitch, the depth, and the like of the concave and convex shape.

For example, A non-patent document by NTT Advanced Technology Corporation, "Hachouizonsei no Nai Hanshaboushitai (Mosuai) You Seikeikanagatagenban (Molding Die Master for Antireflector (Moth-eye) Exhibiting No Wavelength Dependence)", [online], [Searched on Sep. 3, 2007], Internet <http://keytech.ntt-at.co.jp/nano/prd_0016.html>, discloses an optical element having the above-described configuration. This optical element is produced as described below. A concave and convex photoresist pattern is formed by electron beam recording on a photoresist on a Si substrate, and the Si substrate is etched while the concave and convex photoresist pattern is used as a mask. In this manner, as shown in FIG. 16, a Si master having sub-wavelength structures (pitch: about 300 nm, depth: about 400 nm) in the shape of fine tents are produced.

Regarding the Si master produced as described above, an antireflection effect can be obtained with respect to light with a wide wavelength range. Furthermore, as shown in FIG. 17, the above-described sub-wavelength structures are formed into the shapes of hexagonal lattices and, thereby, a very high performance antireflection effect (reflectance of 1% or less) can be obtained in a visible light region (refer to FIG. 18). In FIG. 18, $I_1$ and $I_2$ represent the reflectance of a Si flat portion and the reflectance of a pattern portion, respectively.

Subsequently, a Ni plating stamper of the resulting Si master is produced. As shown in FIG. 19, concave and convex structures which are the reverse of those of the Si master are disposed in a predetermined region on the surface of this stamper. The resulting stamper is used so as to transfer the concave and convex pattern to a transparent polycarbonate resin. In this manner, a desired optical element (duplicate substrate) is obtained. This optical element can exert a high performance antireflection effect (reflectance of 0.3% or less) as well (refer to FIG. 20). In FIG. 20, $I_3$ and $I_4$ represent the reflectance without pattern and the reflectance with pattern, respectively.

Regarding the optical element disclosed in the above-described non-patent document, the reflectance can be reduced to 0.3% or less. However, in recent years, further reduction of the reflectance of the optical element has been desired.

Accordingly, it is desirable to provide an optical element exhibiting further excellent antireflection characteristic and a method for manufacturing a master for producing an optical element to produce the above-described optical element.

SUMMARY

In the technical field of the above-described optical elements, further reduction of arrangement pitch in an optical element has been studied previously to improve the antireflection characteristic. However, according to the study conducted by the present inventors to improve the antireflection characteristic, it was found that an excellent antireflection characteristic was able to be obtained by increasing the arrangement pitch in the optical element than ever in contrast to reduction of the pitch in related art.

The present application has been made on the basis of the above-described studies.

An optical element according to an embodiment has a plurality of structures including convex portions or concave portions arranged on a base member surface, wherein the arrangement pitch of the structures is 380 nm to 680 nm and the aspect ratio of the structure is 0.62 to 1.09.

In the optical element according to an embodiment, the arrangement pitch of the structures is specified to be 380 nm to 680 nm and the aspect ratio is specified to be 0.62 to 1.09. Therefore, the arrangement pitch of the structures is larger than that in an optical element based on the related art. Since the arrangement pitch of the structures increases, the reflectance is reduced as compared with that of the optical element in the related art.

A method for manufacturing a master for producing an optical element according to an embodiment is a method for manufacturing a master for producing an optical element in which a plurality of structures including convex portions or concave portions are arranged on a substrate surface, the method including the steps of preparing a substrate provided with a resist layer on a surface, forming a latent image by applying laser light to the resist layer intermittently while the substrate is rotated and the laser light is moved relatively in a direction of the rotation radius of the substrate, forming a resist pattern on the surface of the substrate by developing the resist layer, and forming concave and convex structures on the surface of the substrate by conducting an etching treatment while the resist pattern is used as a mask, wherein in the forming a latent image, the latent image is formed in such a way that the arrangement pitch of the structures becomes 380 nm to 680 nm, and in the forming concave and convex structures, the etching treatment is conducted in such a way that the aspect ratio of the structure becomes 0.62 to 1.09.

In the method for manufacturing a master for producing an optical element according to an embodiment, a latent image is formed by applying laser light to the resist layer intermittently while the substrate is rotated and the laser light is moved relatively in a direction of the rotation radius of the substrate. Therefore, the operation time of exposure can be shortened as compared with that of the exposure by the electron beam recording in the related art. Consequently, the master for producing an optical element can be produced in a shorter time than ever.

As described above, according to an embodiment, an optical element having an excellent antireflection characteristic and a high transmission factor can be obtained. Furthermore, such an optical element can be produced with high productivity.

Additional features and advantages are described herein, and will be apparent from the following Detailed Description and the figures.

DETAILED DESCRIPTION

The embodiments according to the present application will be described below with reference to the drawings.

Configuration of Optical Element

Figure 1:
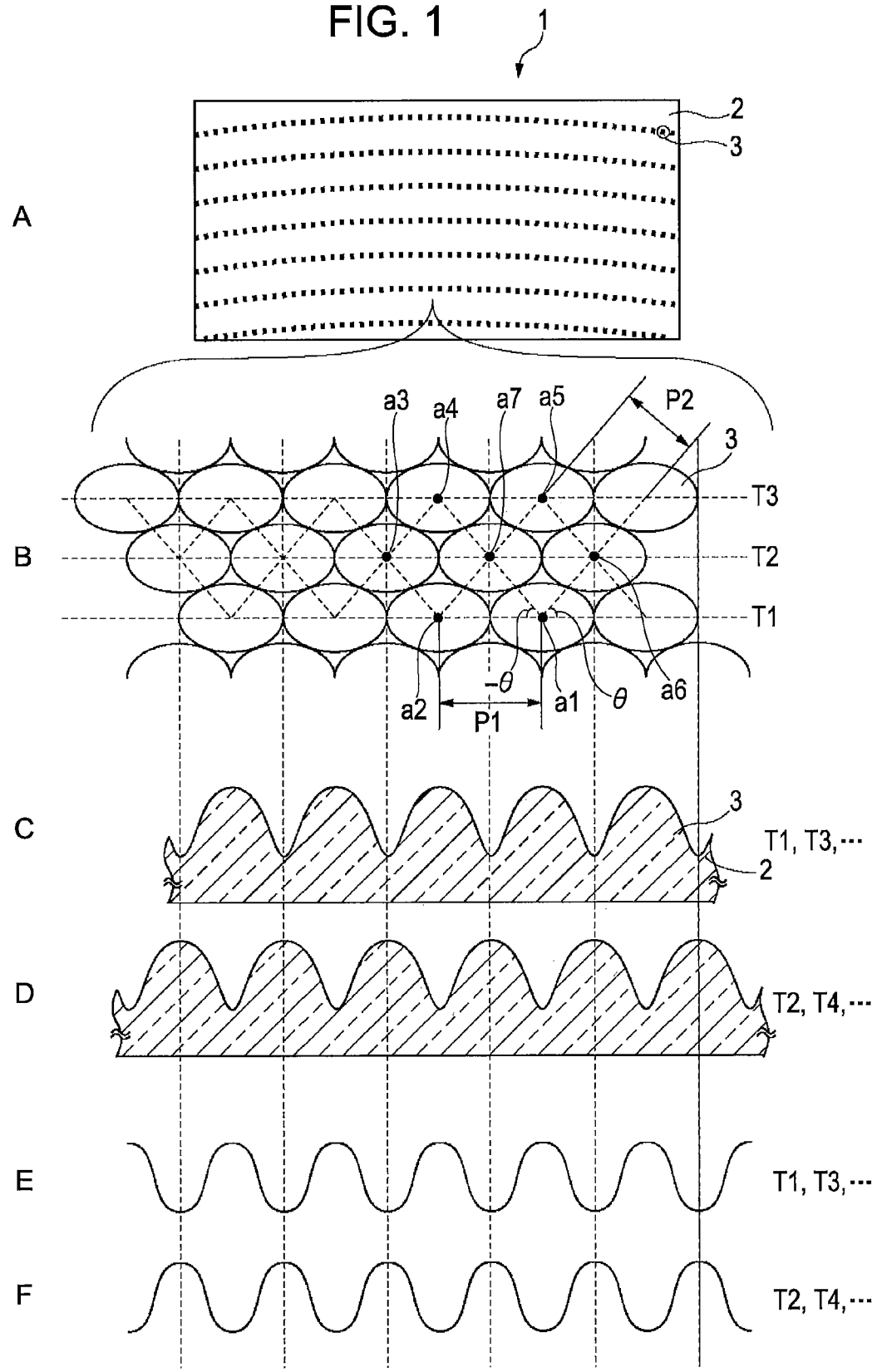
FIG. 1A is a schematic plan view showing an example of the configuration of an optical element according to an embodiment.
FIG. 1B is a magnified partial plan view of the optical element shown in FIG. 1A.
FIG. 1C is a sectional view taken along a track T1, T3, . . . shown in FIG. 1B.
FIG. 1D is a sectional view taken along a track T2, T4, . . . shown in FIG. 1B.
FIG. 1E is a schematic diagram showing a modulation waveform of laser light used for latent image formation, the waveform corresponding to the tracks T1, T3, . . . shown in FIG. 1B.
FIG. 1F is a schematic diagram showing a modulation waveform of laser light used for latent image formation, the waveform corresponding to the tracks T2, T4, . . . shown in FIG. 1B.
Figure 2:
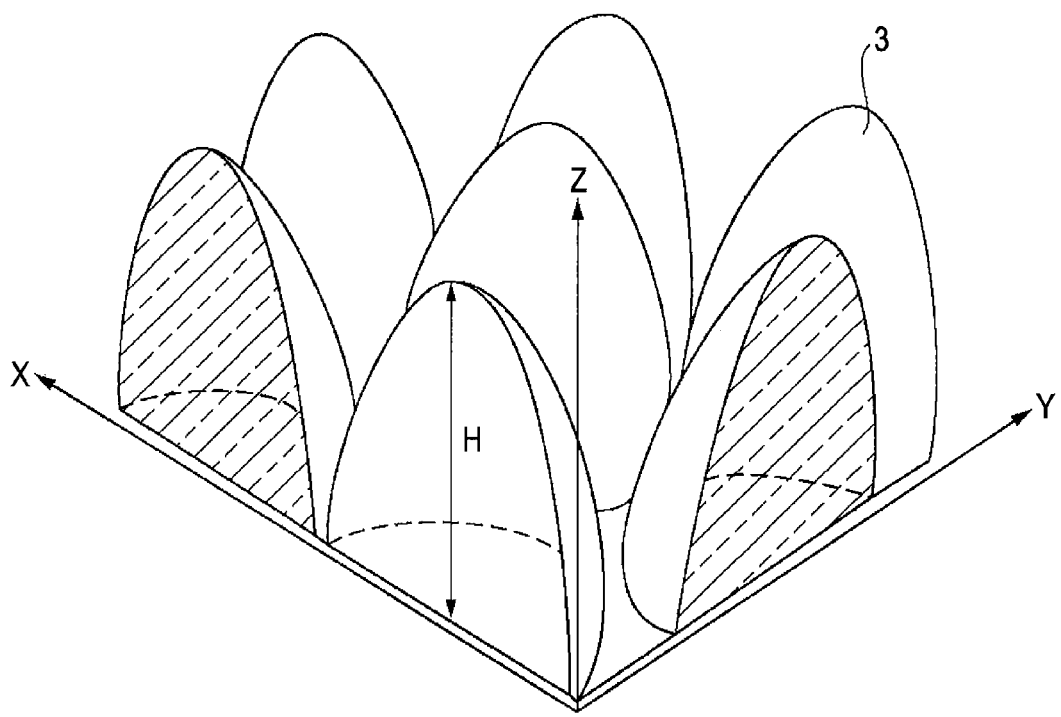
FIG. 2 is a magnified partial perspective view of the optical element shown in FIG. 1A.

FIG. 1A is a schematic plan view showing an example of the configuration of an optical element 1 according to an embodiment. FIG. 1B is a magnified partial plan view of the optical element 1 shown in FIG. 1A. FIG. 1C is a sectional view taken along a track T1, T3, . . . shown in FIG. 1B. FIG. 1D is a sectional view taken along a track T2, T4, . . . shown in FIG. 1B. FIG. 1E is a schematic diagram showing a modulation waveform of laser light used for latent image formation, the waveform corresponding to the tracks T1, T3, . . . shown in FIG. 1B. FIG. 1F is a schematic diagram showing a modulation waveform of laser light used for latent image formation, the waveform corresponding to the tracks T2, T4, . . . shown in FIG. 1B. FIG. 2 is a magnified partial perspective view of the optical element 1 shown in FIG. 1A. This optical element 1 is favorably applied to various optical devices, e.g., displays, optoelectronics, optical communications (optical fibers), solar cells, and illumination apparatuses, and is applicable to, for example, optical fibers and display light guide plates, which have various wavelength ranges. Furthermore, the optical element 1 is applicable to optical filters having transmission factors in accordance with the incident angles of incident light and backlight apparatuses including the optical filters.

As shown in FIG. 1A and FIG. 1B, the optical element 1 of the present embodiment has a configuration in which a plurality of structures 3 including convex portions are arranged at a pitch substantially equal to the wavelength of visible light on a surface of a base member 2. This optical element 1 has a function of preventing reflection of light which passes through the base member 2 in the Z direction (which is perpendicular to the X direction and the Y direction) shown in FIG. 2 at the interface between the structures 3 and air surrounding them.

The base member 2 is a transparent base member having a light transmission property, and is formed from transparent synthetic resins, e.g., polycarbonate (PC) and polyethylene terephthalate (PET), glass, and the like. The form thereof is not specifically limited and may be in the form of a film, a sheet, a plate, or a block. The form of the base member 2 is determined in accordance with the shapes and the like of main body portions of various optical devices, e.g., displays, optoelectronics, optical communications, solar cells, and illumination apparatuses, which are in need of predetermined antireflection functions, and sheet-shaped or film-shaped antireflection function components mounted on these optical devices.

For example, the structures 3 are formed integrally with the base member 2. The individual structures 3 is in the same shape, although not limited to this. For example, the structure 3 is formed into the shape having a cone structure in which the bottom has a major axis and a minor axis and is elliptical, oval, or egg-shaped and the top portion is in a curved or flat shape. In particular, an elliptical cone shape is preferable, in which the slope of the top portion is gentle and the slope becomes sharp from the middle portion toward the bottom portion gradually. This is because the durability and the transfer property can be improved.

The structures 3 are not limited to the convex shapes and may be composed of concave portions formed on the surface of the base member 2. The height of the structure 3 is not specifically limited and is, for example, about 420 nm. Specifically, the height is 415 nm to 421 nm. In the case where the structures 3 are composed of concave shapes, the depth of the structure 3 corresponds to the height.

It is preferable that the height H1 of the structures 3 in the circumferential direction of the track T is smaller than the height H2 of the structures 3 in the radius direction of the arc-shaped track T. That is, preferably, the heights H1 and H2 of the structures 3 satisfy the relationship represented by H1<H2. This is because if the structures 3 are arranged in such a way as to satisfy the relationship represented by H1≥H2, the need for an increase in the arrangement pitch P1 in the circumferential direction arises and, thereby, the filling factor of the structures 3 in the circumferential direction is reduced. Reduction in the filling factor, as described above, causes deterioration in reflection characteristic.

Figure 3:
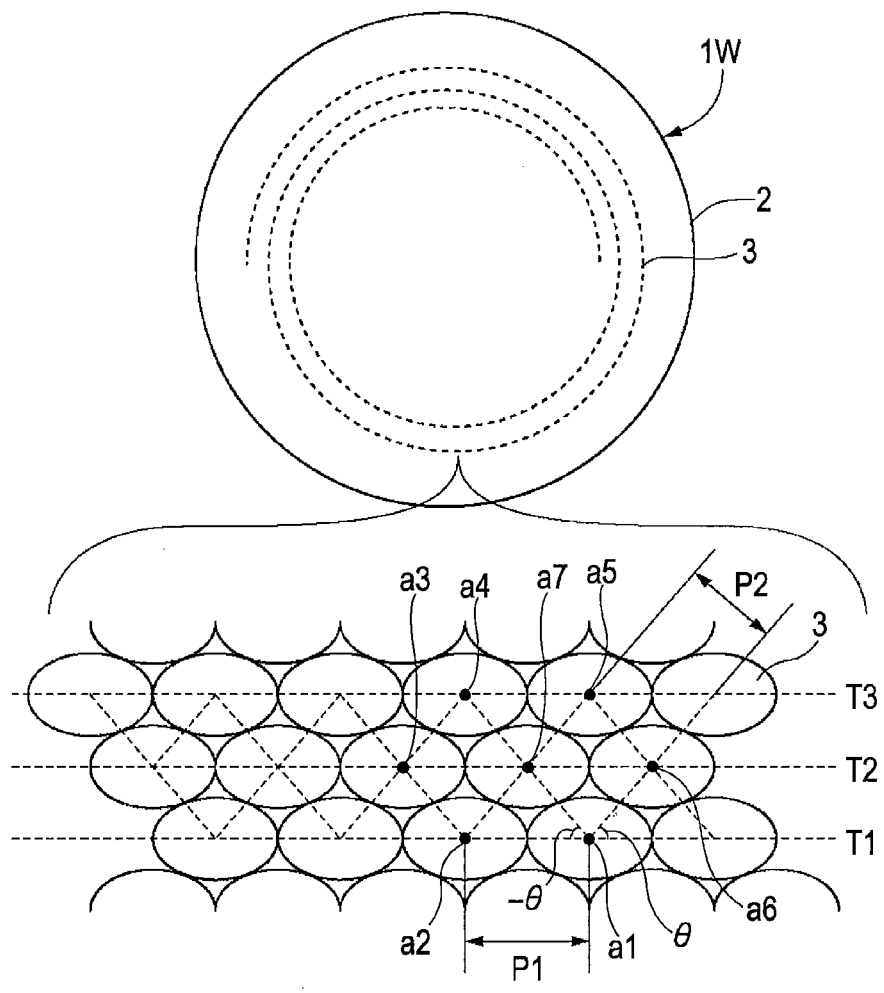
FIG. 3 is a schematic plan view showing an example of the configuration of a disk-shaped optical element.

FIG. 3 is a schematic plan view showing an example of the configuration of a disk-shaped optical element 1W. As shown in FIG. 3, the structures 3 are formed almost all over the surface of the disk-shaped optical element 1W and, thereafter, the optical element 1 is formed by cutting a predetermined product size from the disk-shaped optical element 1W. The structures 3 are formed on the basis of an exposure pattern formed on a substrate by using a recording apparatus described later. Since the optical element 1 having a predetermined size is cut from the disk-shaped optical element 1W, the structures of the optical element 1 have an arrangement form constituting a plurality of arc-shaped tracks T1, T2, T3, . . . (hereafter may be generically referred to as "tracks T") on the surface of the base member 2, as shown in FIG. 1A.

It is preferable that a skirt portion is provided to a peripheral portion of the structure 3. This is because the optical element can be easily peeled from a die or the like in a production step of the optical element. It is preferable that the skirt portion takes a curved shape in which the height is reduced gradually from the viewpoint of the above-described peeling characteristic. The skirt portion may be provided to a part of the peripheral portion, but it is preferable that the skirt portion is provided to the whole peripheral portion of the structure 3 from the viewpoint of an improvement in the above-described peeling characteristic. In the case where the structure 3 is composed of a concave portion, the skirt portion is a curved surface provided to the peripheral portion of an opening of the concave portion serving as the structure 3.

Figure 17:
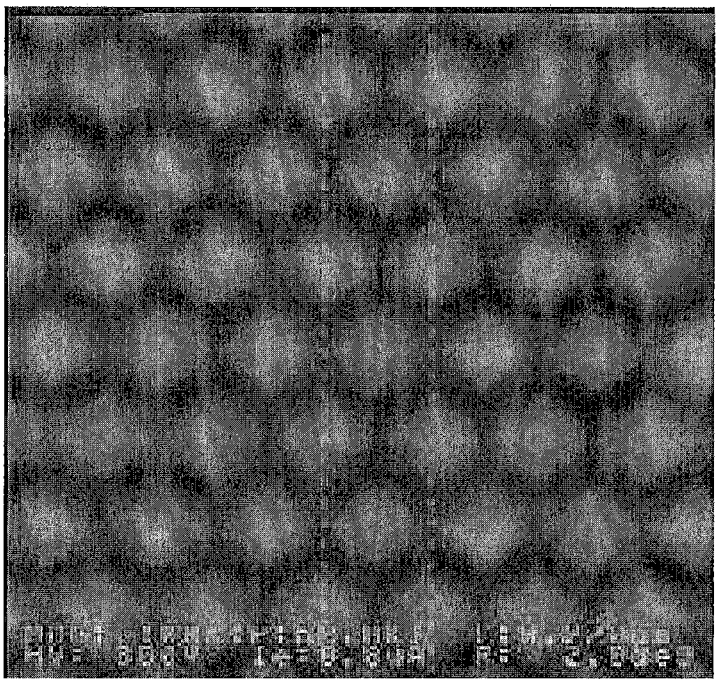
FIG. 17 is a diagram showing the configuration of a Si master in related art.
Figure 18:
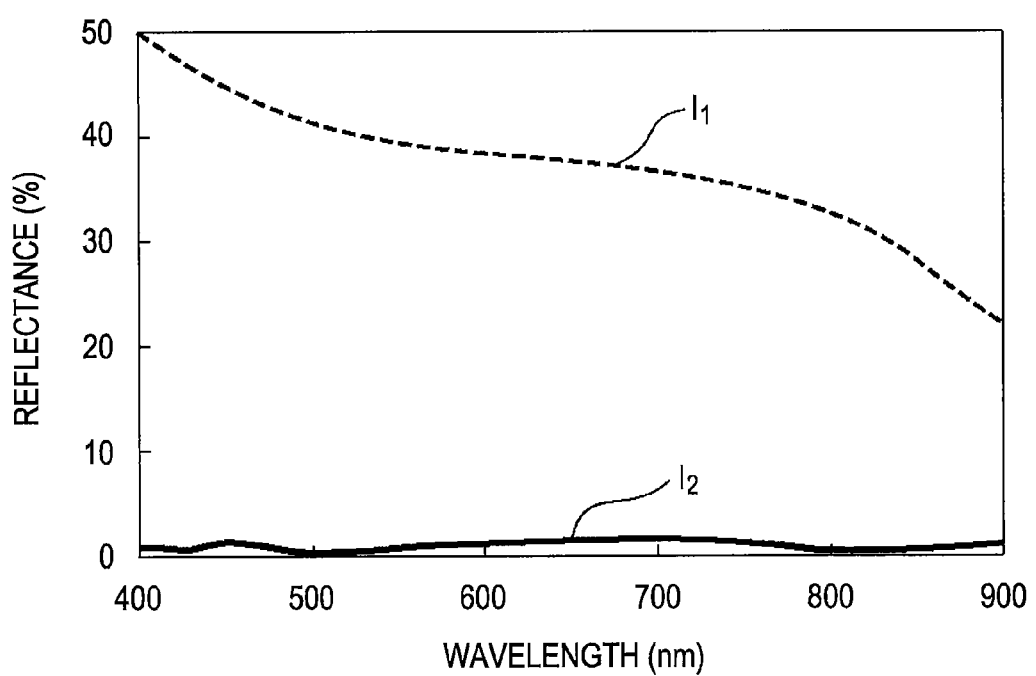
FIG. 18 is a graph showing the relationship between the wavelength and the reflectance of a Si master in related art.
Figure 19:
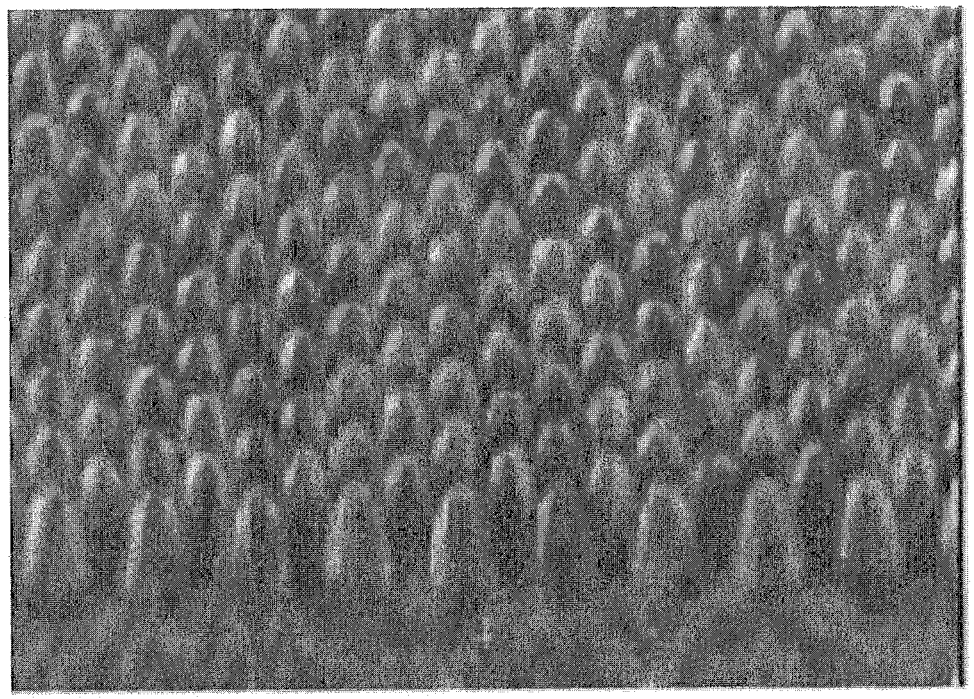
FIG. 19 is a magnified diagram of a Ni plating stamper in related art.

Regarding individual structures 3 in adjacent two tracks T, the individual structures 3 in one track (for example, T1) are arranged at midpoints (positions shifted by a half pitch) between the individual structure 3 arranged in the other track (for example, T2). As a result, as shown in FIG. 1B, individual structures 3 are arranged in such a way that in adjacent three tacks (T1 to T3), the centers of the structures 3 are positioned at individual points a1 to a7 and, thereby, a quasi-hexagonal lattice pattern is formed. In the present application, the quasi-hexagonal lattice pattern refers to a hexagonal lattice pattern contorted along the arc shape of the tracks T in contrast to a regular hexagonal lattice pattern as shown in FIG. 17.

Furthermore, since the individual structures 3 are arranged in such a way as to form the above-described quasi-hexagonal lattice pattern, as shown in FIG. 1B, the arrangement pitch P1 (distance between a1 and a2) of the structures 3 in the same track (for example, track T1) is larger than the arrangement pitch of the structures 3 between adjacent two tracks (for example, T1 and T2), that is, the arrangement pitch P2 (for example, distance between a1 and a7, a2 and a7) of the structures 3 in an about ±60° direction relative to the circumferential direction. An angle −θ is formed between a line of track T1 and a line connecting points a1 and a7. Also, an angle θ is formed between a line of track T1 and a line connecting points a1 and a6. The structures 3 are arranged as described above and, thereby, the packing density of the structures 3 is further improved.

Preferably, the pitch P of the structures 3 is specified to be 380 nm to 680 nm, and the aspect ratio (height H/pitch P) of the structures 3 is specified to be 0.62 to 1.09. More preferably, the pitch P of the structures 3 is specified to be 400 nm to 650 nm, and the aspect ratio (height H/pitch P) of the structures 3 is specified to be 0.65 to 1.03. Excellent antireflection characteristic can be realized by employing the above-described ranges.

In the present application, the aspect ratio is defined by the following formula (1).

$$\text{aspect ratio} = H/P \quad (1)$$

where H: height of structure, P: pitch

Furthermore, the height of the structure 3 is specified to be the height of the structure 3 in the radius direction. The height of the structure 3 in the circumferential direction is smaller than the height in the radius direction, and the heights of portions in directions other than the circumferential direction of the structure 3 are substantially equal to the height in the radius direction. Therefore, the depth of sub-wavelength structure is typified by the height in the radius direction. Incidentally, in the case where the structure 3 is a concave portion, the height H of the structure in the above-described formula (1) is specified to be the depth H of the structure.

Method for Manufacturing Optical Element

A method for manufacturing the optical element 1 having the above-described configuration will be described below with reference to FIG. 4A to FIG. 7B. In the present embodiment, the optical element 1 having the above-described configuration is produced through a master preparation step, a duplicate substrate preparation step, a die preparation step, and an optical element preparation step.

Master Preparation Step

Figure 4A:
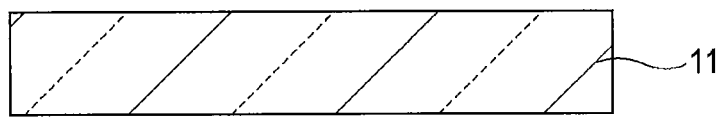
FIG. 4A to FIG. 4C are step diagrams for explaining a method for manufacturing an optical element.
Figure 4B:
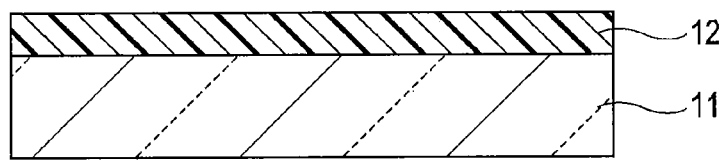

As shown in FIG. 4A, a disk-shaped substrate 11 is prepared. This substrate 11 is, for example, a quartz substrate. As shown in FIG. 4B, a resist layer 12 is formed on the surface of the substrate 11. The resist layer 12 may be an organic material or an inorganic material. As for the organic resist, for example, a novolac resist and a chemically amplified resist can be used. As for the inorganic resist, for example, a metal oxide formed from at least one type of transition metal, e.g., tungsten and molybdenum, is favorable.

Figure 4C:
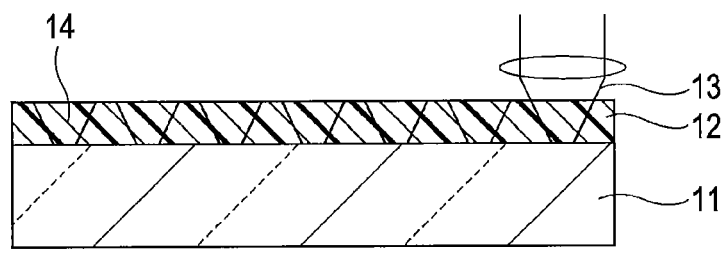

As shown in FIG. 4C, the substrate 11 is rotated and, in addition, laser light (exposure beam) 13 is applied to the resist layer 12. At this time, the laser light 13 is applied intermittently while the laser light is moved in a radius direction of the substrate 11 and, thereby, the all over the surface of the resist layer 12 is exposed. In this manner, a latent image 14 in accordance with the locus of the laser light 13 is formed on all aver the surface of the resist layer 12 at a pitch substantially equal to the wavelength of visible light. This exposure step will be described later in detail.

This exposure step is conducted while the period of application of the laser light 13 to the resist layer 12 is changed on a track basis and, thereby, structures (latent image) can be formed and arranged into the shape of a quasi-hexagonal lattice pattern with respect to adjacent three tracks. Regarding the period of application of the laser light 13, for example, a base member 2 is rotated at a constant angular velocity, and a pulse frequency of the laser light 13 is optimized in such a way that the arrangement pitch of the structures 3 in the circumferential direction becomes constant. Specifically, modulation control is conducted in such a way that the application period of the laser light 13 is reduced with decreasing proximity of the position of the track to the center of the base member. In this manner, a nanopattern of a uniform spatial frequency can be formed on all over the base member.

A developer is dropped on the resist layer 12 while the substrate 11 is rotated, so as to subject the resist layer 12 to a development treatment, as shown in FIG. 5A. In the case where the resist layer 12 is formed from a positive resist, as shown in the drawing, the dissolution rate of the exposed portion, which has been exposed with the laser light 13, into the developer increases as compared with that of a non-exposure portion and, therefore, a pattern in accordance with the exposure portion (latent image 14) is formed on the resist layer 12.

The surface of the substrate 11 is subjected to an etching treatment while the pattern (resist pattern) of the resist layer 12 formed on the substrate 11 is used as a mask. In this manner, as shown in FIG. 5B, concave portions (structures) 15a in the shape of an elliptical cone or the shape of an elliptical truncated cone, in which a direction of the major axis is a circumferential direction of the arc-shaped track, can be obtained. Regarding the etching method, for example, dry etching is conducted. At this time, by conducting an etching treatment and an ashing treatment alternately, for example, a pattern of cone-shaped concave portions 15a can be formed and, in addition, a quartz master having a depth three times or more larger than the resist layer (selection ratio of 3 or more) can be prepared, so that the structure 3 can have a higher aspect ratio.

As described above, a master 15 for producing an optical element of the present embodiment is produced. This master 15 is a standard of master, and surface concave and convex structure formed from concave portions 15a form structures 3 of the optical element 1 through a duplicate substrate and a molding die, as described later. Therefore, the concave portions 15a of the master 15 are arranged in such a way as to form a quasi-hexagonal lattice pattern contorted in the circumferential direction of the master 15.

Figure 6:
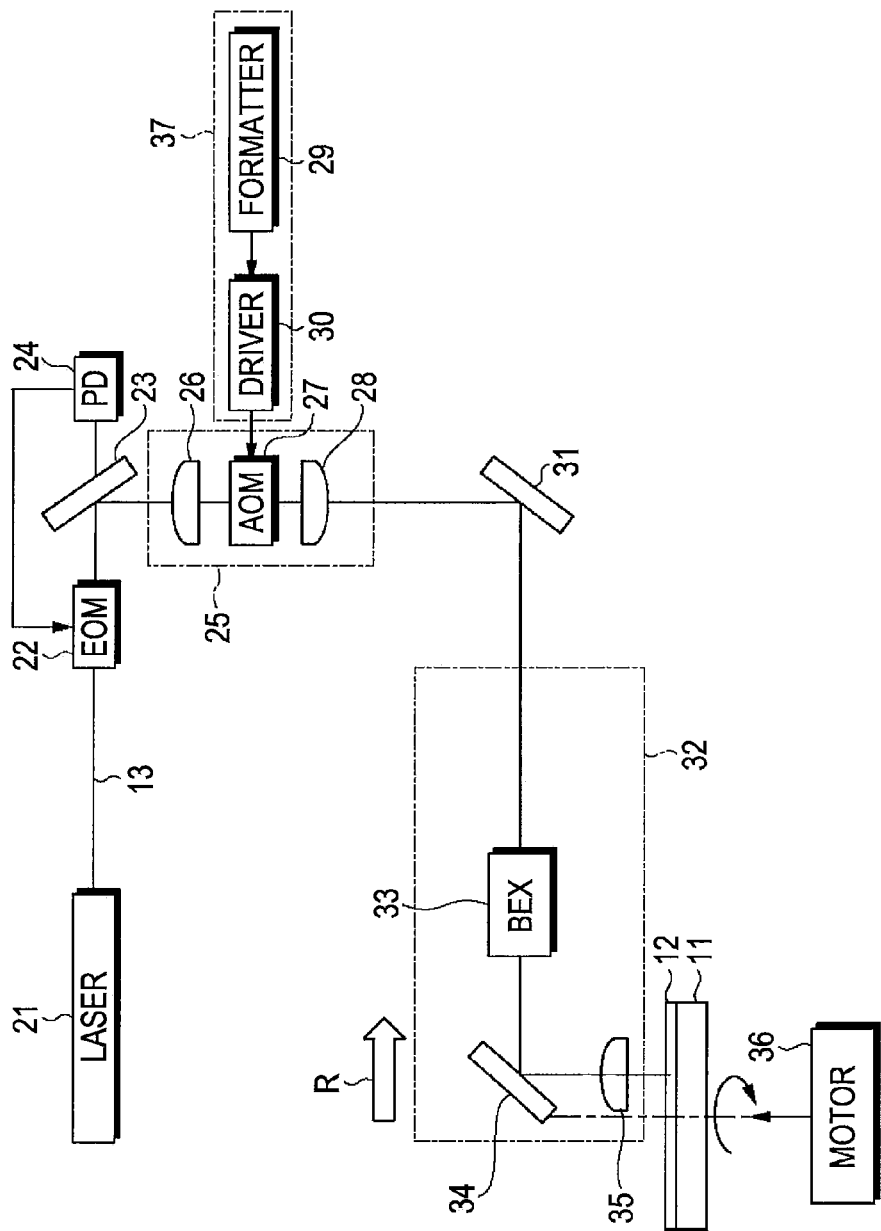
FIG. 6 is a schematic configuration diagram of an exposure apparatus used for a manufacturing step of a master.

The exposure step shown in FIG. 4C will be described below in detail with reference to FIG. 6. FIG. 6 is a schematic configuration diagram of an exposure apparatus. In the present embodiment, the exposure apparatus has a configuration based on an optical disk recording apparatus.

A laser light source 21 is a light source for exposing the resist layer 12, the film of which is formed on the surface of the substrate 11, and produces far ultraviolet laser light 13 with a wavelength $\lambda$=266 nm, for example. The laser light 13 emitted from the laser light source 21 goes straight while remaining a parallel beam and enters an electro optical modulator (EOM) 22. The laser light 13 passed through the electro optical modulator 22 is reflected at a mirror 23, and is led to a modulation optical system 25.

The mirror 23 is formed from a polarization beam splitter and has a function of reflecting one polarization component and transmitting the other polarization components. The polarization components passed through the mirror 23 are received by a photodiode 24. The electro optical modulator 22 is controlled on the basis of the received light signal, so that phase modulation of the laser light 13 is conducted.

In a modulation optical system 25, the laser light 13 is collected with a condenser lens 26 into an acoust-optic modulator (AOM) 27 formed from quartz ($SiO_2$) or the like. The laser light 13 is diverged through intensity modulation with the acoust-optic modulator 27 and, thereafter, is converted to a collimated beam with a lens 28. The laser light 13 emitted from the modulation optical system 25 is reflected at a mirror 31 and is led to a moving optical table 32 horizontally and in parallel.

The moving optical table 32 is provided with a beam expander 33, a mirror 34, and an objective lens 35. The laser light 13 led to the moving optical table 32 is shaped into a desired beam shape with the beam expander 33 and, thereafter, is applied to the resist layer 12 on the substrate 11 through the mirror 34 and the objective lens 35. The substrate 11 is placed on a turntable (not shown in the drawing) connected to a spindle motor 36. Subsequently, the exposure step of the resist layer 12 is conducted by applying the laser light 13 to the resist layer 12 intermittently while the substrate 11 is rotated and, in addition, the laser light 13 is moved in a direction of the rotation radius of the substrate 11. The latent image 14 is substantially formed into the shape of an ellipse having a major axis in the circumferential direction. The movement of the laser light 13 is conducted by movement of the moving optical table 32 in the direction indicated by an arrow R.

The exposure apparatus shown in FIG. 6 is provided with a control mechanism 37 for forming the latent image 14 corresponding to a two-dimensional pattern of the quasi-hexagonal lattice shown in FIG. 1B on the resist layer 12. The control mechanism 37 is provided with a formatter 29 and a driver 30. The formatter 29 is provided with a polarity reverse portion, and this polarity reverse portion controls the timing of application of the laser light 13 to the resist layer 12. The driver 30 control the acoust-optic modulator 27 on the basis of the output from the polarity reverse portion.

The control mechanism 37 synchronizes the intensity modulation of the laser light 13 with the acoust-optic modulator 27, the drive rotation rate of the spindle motor 36, and the movement rate of the moving optical table 32 with each other on a track basis in such a way that the two-dimensional patterns of the latent image 14 link spatially. The rotation of the substrate 11 is controlled at a constant angular velocity (CAV). Then, patterning is conducted with the appropriate number of revolutions of the substrate 11 owing to the spindle motor 36, the appropriate frequency modulation of the laser intensity owing to the acoust-optic modulator 27, and the appropriate feed pitch of the laser light 13 owing to the moving optical table 32. In this manner, the latent image 14 of the quasi-hexagonal lattice pattern is formed on the resist layer 12.

For example, a feed pitch of 323 nm is favorable to specify the period P1 in the circumferential direction to be 400 nm and specify the period P2 in about 60° direction (about −60° direction) relative to the circumferential direction to be 380 nm. Furthermore, the control signal of the polarity reverse control portion is changed gradually in such a way that the spatial frequencies (pattern density of latent image 14, P1: 400 nm, P2: 380 nm) become uniform. More specifically, the exposure is conducted while the period of application of the laser light 13 to the resist layer 12 is changed on a track basis and the frequency modulation of the laser light 13 is conducted in the control mechanism 37 in such a way that P1 of each of tracks T becomes substantially 400 nm. That is, modulation control is conducted in such a way that the application period of the laser light 13 is reduced with decreasing proximity of the position of the track to the center of the substrate. In this manner, a nanopattern with a uniform spatial frequency all over the substrate can be formed.

Figure 5:
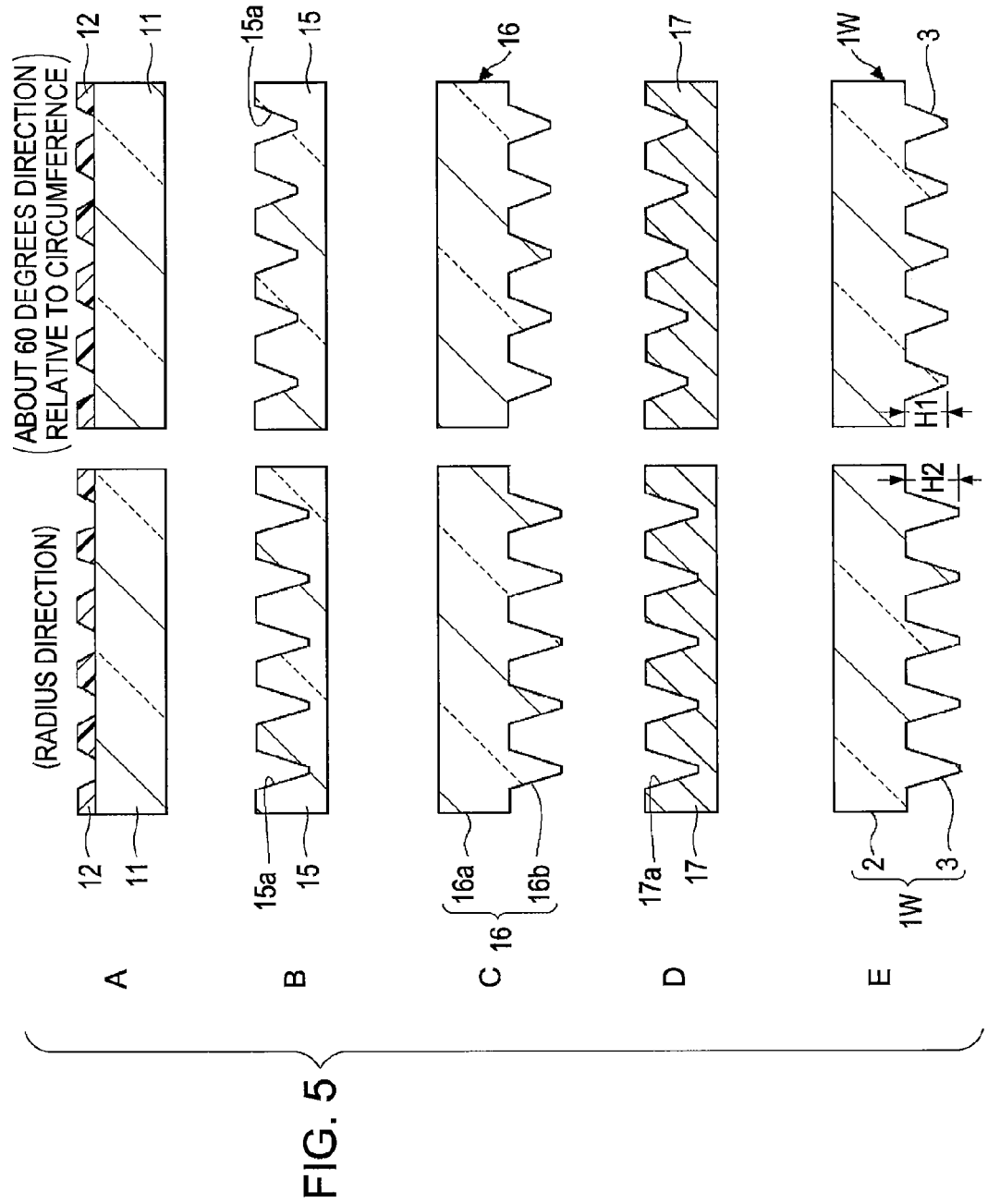
FIG. 5A to FIG. 5E are step diagrams for explaining a method for manufacturing an optical element.

A series of steps for producing the optical element 1 from the master 15 will be described below with reference to FIG. 5.

As described above, the pattern of the resist layer 12 is formed on the surface of the substrate 11. The master 15 is prepared from this state by conducting an etching treatment while this resist pattern is used as a mask, so as to form concave and convex structures including concave portions 15a on the surface of the substrate 11.

Here, regarding the pattern of the resist layer 12, the layer thickness in the radius direction of the substrate 11 and the layer thickness in the circumferential direction are different after the development, and the layer thickness in the circumferential direction is smaller than the layer thickness in the radius direction. This is because the laser light 13 is applied while the substrate 11 is rotated in the exposure step and, thereby, the application time of the laser light 13 in the circumferential direction of the substrate becomes longer than the application time in the radius direction, so that the difference occurs in the layer thicknesses of the resist layer 12 after the development. In the etching treatment conducted thereafter, anisotropy of shape is provided to the resulting concave portions 15a because of the difference between the layer thickness of the resist layer 12 in the circumferential direction of the substrate 11 and the layer thickness in the radius direction.

Duplicate Substrate Preparation Step

A photo-curable resin, e.g., an ultraviolet-curable resin, is applied to the concave and convex structure surface of the prepared master 15, and a transparent substrate, e.g., an acrylic plate, is stacked thereon. Ultraviolet radiation is applied from above the transparent substrate so as to cure the photo-curable resin and, thereafter, the resulting resin is peeled from the master. In this manner, as shown in FIG. 5C, a duplicate substrate 16 in which structures 16b composed of the photo-cured resin are formed on the transparent substrate 16a is prepared.

Die Preparation Step

An electrically conductive film is formed on the concave and convex structure surface of the resulting duplicate substrate 16 by an electroless plating method. Thereafter, a metal plating layer is formed by an electroplating method. As for a material constituting these electroless plating layer and electroplating layer, for example, nickel (Ni) is suitable. After the plating layer is formed, the plating layer is peeled from the duplicate substrate 16 and, if necessary, external working is conducted, so that a die 17 provided with concave portions 17a is prepared, as shown in FIG. 5D.

Optical Element Preparation Step

Figure 7A:
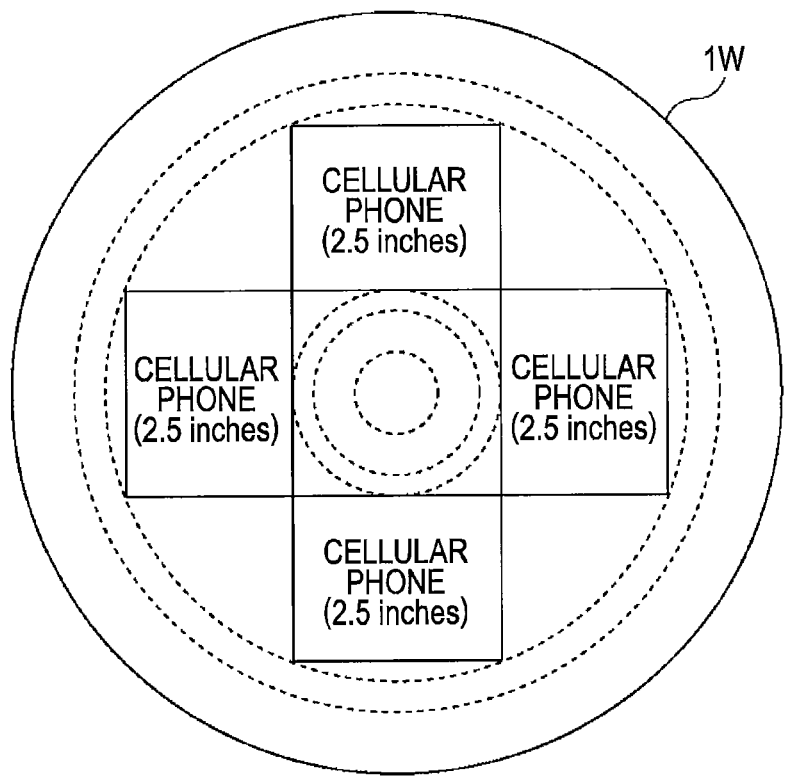
FIG. 7A and FIG. 7B are schematic diagrams for explaining a method for manufacturing an optical element.
Figure 7B:
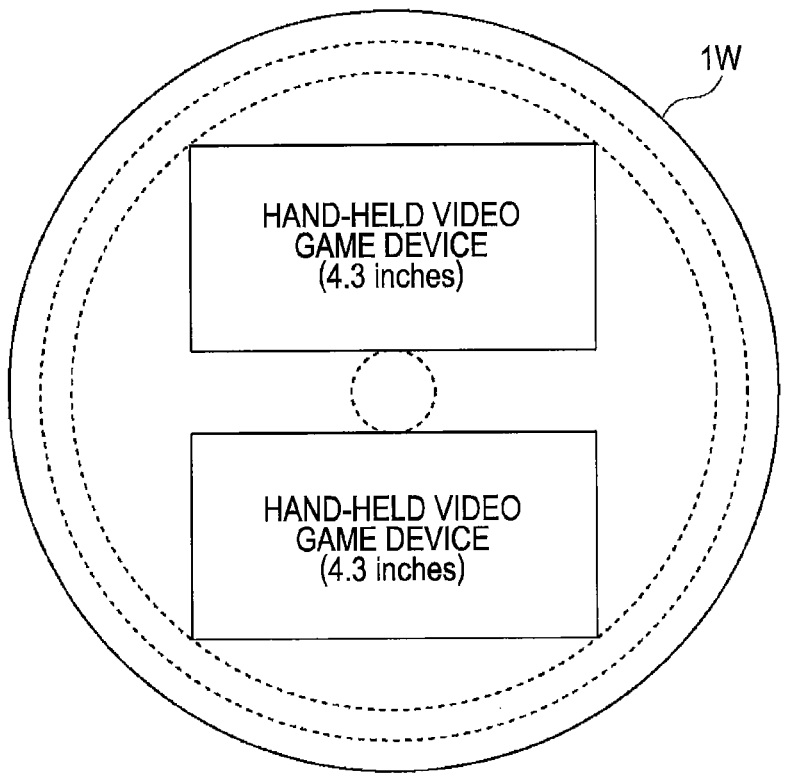

The resulting die 17 is set as a molding die of an injection molding machine, the die is closed, and a cavity is formed. Thereafter, a molten resin, e.g., polycarbonate, is filled therein, so that a disk-shaped optical element 1W in which structures 3 are formed integrally on the surface is prepared, as shown in FIG. 5E. Subsequently, as shown in FIG. 7A and FIG. 7B, the optical element 1 in the form shown in FIG. 1 is prepared by cutting a product having a predetermined size from the disk-shaped optical element 1W.

Formation of the master 15 is not limited to the etching treatment of the substrate 11. The substrate 11 provided with the pattern of the resist layer 12 can also be used as a master without being processed.

As described above, according to the present embodiment, a plurality of structures 3 including convex portions or concave portions are arranged on a base member surface in such a way that the arrangement pitch becomes 380 nm to 680 nm and the aspect ratio becomes 0.62 to 1.09. Therefore, the arrangement pitch of the structures 3 is larger than that in an optical element in related art. The reflectance is reduced as compared with that of the optical element in related art by increasing the arrangement pitch of the structures 3 as described above.

In the case where the structures 3 are formed in such a way as to constitute a plurality of arc-shaped tracks and constitute a quasi-hexagonal lattice pattern in adjacent three tracks, the filling factor of the structures 3 on the base member surface is allowed to increase. Consequently, an antireflection efficiency with respect to visible light increases and the optical element 1 having an excellent antireflection characteristic and a very high transmission factor can be obtained.

Figure 16:
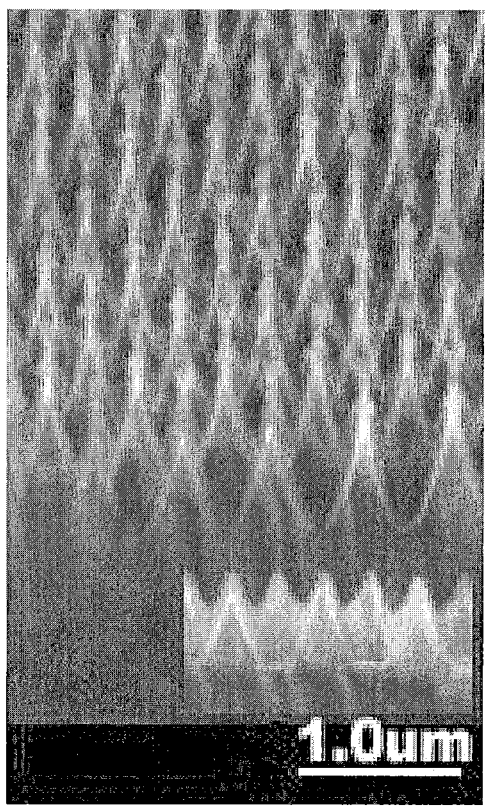
FIG. 16 is a diagram showing the configuration of a Si master in related art.

Furthermore, regarding the optical element 1 in which each structure 3 is allowed to take the shape of an elliptical cone, the durability of the concave and convex structure surface of the optical element 1 can be enhanced as compared with that of the optical element in which each structure is allowed to take the shape of a tent in related art (refer to FIG. 16). In addition, the transfer property of the concave and convex structure surface of each of the duplicate substrate 16, the die 17, and the optical element 1 can be enhanced.

Moreover, since the master 15 is prepared by using the exposure apparatus, to which the optical disk recording apparatus is applied, the optical element 1 having the above-described configuration can be produced efficiently in a short time and, in addition, it becomes also possible to respond to upsizing of the base member 2. Consequently, the productivity can be enhanced.

EXAMPLES

The present application will be specifically described below with reference to examples. However, the present application is not limited to merely these examples.

Example 1

Master Preparation Step

A chemically amplified or novolac positive resist layer having a thickness of about 150 m is applied to a quartz substrate. A latent image of a quasi-hexagonal lattice pattern was formed on this resist layer by using an exposure apparatus shown in FIG. 6. The wavelength of laser light was specified to be 266 nm, and the laser power was specified to be 0.50 mJ/m. Thereafter, the resist layer was subjected to a development treatment so as to prepare a resist pattern. As for a developer, inorganic alkaline developer (produced by TOKYO OHKA KOGYO CO., LTD.) was used.

A process for removing the resist pattern by $O_2$ ashing so as to enlarge an opening diameter and a process for etching the quartz substrate by plasma etching in a $CHF_3$ gas atmosphere were conducted repeatedly. As a result, etching proceeded while the diameter of the quasi-hexagonal lattice pattern, at which the surface of the quartz substrate was exposed, increased gradually, and the other region was not etched because the resist pattern served as a mask, so that concave portions having cross-sections substantially in the shape of a triangle, as schematically shown in FIG. 5B, were formed. The amount of etching was changed depending on the etching time. Finally, the resist pattern was removed completely by $O_2$ ashing.

In this manner, quartz masters having concave portion quasi-hexagonal lattice patterns were prepared, wherein the pitches P1 in the circumferential direction (periods in the circumferential direction) were 400 nm, 480 nm, 580 nm, and 680 nm, the pitches P2 in about 60° direction relative to the circumferential direction (periods in about 60° direction relative to the circumference) were 380 nm, 450 nm, 550 nm, and 650 mm, and the depth was about 420 mm.

Duplicate Substrate Preparation Step

An ultraviolet-curable resin was applied to the resulting quartz master, and an acrylic plate was adhered to the ultraviolet-curable resin. Ultraviolet radiation was applied so as to cure the ultraviolet-curable resin and, thereafter, the resulting resin was peeled from the quartz master. In this manner, a duplicate substrate having a convex portion quasi-hexagonal lattice pattern was prepared.

Molding Die Preparation Step

An electrically conductive film composed of a nickel coating film was formed on the concave and convex pattern of the resulting duplicate substrate by an electroless plating method. The duplicate substrate provided with the electrically conductive film layer was set in an electroforming apparatus, and a nickel plating layer having a thickness of about 300±5 μm was formed on the electrically conductive film by an electroplating method. Subsequently, the nickel plating layer was peeled from the duplicate substrate by using a cutter or the like, and the transferred concave and convex structure surface was washed with acetone, so that a Ni metal master (molding die) having a concave portion quasi-hexagonal lattice pattern was prepared.

Optical Element Preparation Step

An injection-molded substrate of a polycarbonate resin was prepared by using the resulting Ni metal master, so that a disk-shaped duplicate substrate having a convex portion quasi-hexagonal lattice pattern on the surface was obtained. Thereafter, the resulting duplicate substrate was cut into a predetermined size so as to prepare an optical element.

In Examples 2 to 5, duplicate substrates were prepared while the pitch P1 in the circumferential direction, the pitch in about 60° direction relative to the circumference, and the aspect ratio of the structures were changed, and the shapes and the reflection characteristics of the resulting duplicate substrates were evaluated.

Example 2

Master Preparation Step

A resist pattern of the quasi-hexagonal lattice pattern was prepared as in EXAMPLE 1 except that a latent image 14 of the quasi-hexagonal lattice pattern was formed on the resist layer 12, wherein the pitch P1 in the circumferential direction was 400 nm and the pitch P2 in about 60° direction relative to the circumference was 380 nm.

Processes of ashing and etching were conducted in the following order. (1) $O_2$ ashing 4 seconds, $CHF_3$ etching 1 minute, (2) $O_2$ ashing 4 seconds, $CHF_3$ etching 2 minutes, (3) $O_2$ ashing 4 seconds, $CHF_3$ etching 3 minutes, (4) $O_2$ ashing 4 seconds, $CHF_3$ etching 4 minutes, (5) $O_2$ ashing 4 seconds, $CHF_3$ etching 5 minutes, and (6) $O_2$ ashing 4 seconds, $CHF_3$ etching 6 minutes. Finally, $O_2$ ashing was conducted and, thereby, the resist pattern was removed completely.

In this manner, a master of the quasi-hexagonal lattice pattern was prepared.

Duplicate Substrate Preparation Step

A duplicate substrate was prepared as in EXAMPLE 1 except that the resulting quartz master was used.

Example 3

A duplicate substrate was prepared as in EXAMPLE 2 except that a latent image of the quasi-hexagonal lattice pattern was formed on the resist layer, wherein the pitch P1 in the circumferential direction was 480 nm and the pitch P2 in about 60° direction relative to the circumference was 450 nm.

Example 4

A duplicate substrate was prepared as in EXAMPLE 2 except that a latent image of the quasi-hexagonal lattice pattern was formed on the resist layer, wherein the pitch P1 in the circumferential direction was 580 nm and the pitch P2 in about 60° direction relative to the circumference was 550 nm.

Example 5

A duplicate substrate was prepared as in EXAMPLE 2 except that a latent image of the quasi-hexagonal lattice pattern was formed on the resist layer, wherein the pitch P1 in the circumferential direction was 680 nm and the pitch P2 in about 60° direction relative to the circumference was 650 nm.

Shape Evaluation 1

The thus produced duplicate substrates 16 of Examples 2 to 5 were observed with an atomic force microscope (AFM). The heights of the structures of individual duplicate substrates were determined from the cross-sectional profiles on the basis of AFM. The results thereof are shown in Table 1. The height of the pattern in the circumferential direction was smaller than the height in the radius direction. Since the heights of portions in directions other than the circumferential direction were substantially equal to the height in the radius direction, the height of the pattern was represented by the height in the radius direction.

TABLE 1

| | Example 2 | Example 3 | Example 4 | Example 5 |
|---|---|---|---|---|
| Etching time (min) | 21 | 21 | 21 | 21 |
| Height H of structure (nm) | 415 | 418 | 420 | 421 |
| Pitch P1 in the circumferential direction (nm) | 400 | 480 | 580 | 680 |
| Pitch P2 in 60° direction relative to circumference (nm) | 380 | 450 | 550 | 650 |
| Average pitch P (nm) | 387 | 460 | 560 | 660 |
| Aspect ratio (H/P) | 1.07 | 0.91 | 0.75 | 0.64 |

Shape Evaluation 2

The thus produced duplicate substrates of Examples 2 and 5 were observed with an scanning electron microscope (SEM). The results thereof are shown in FIG. 8 and FIG. 9.

Figure 8:
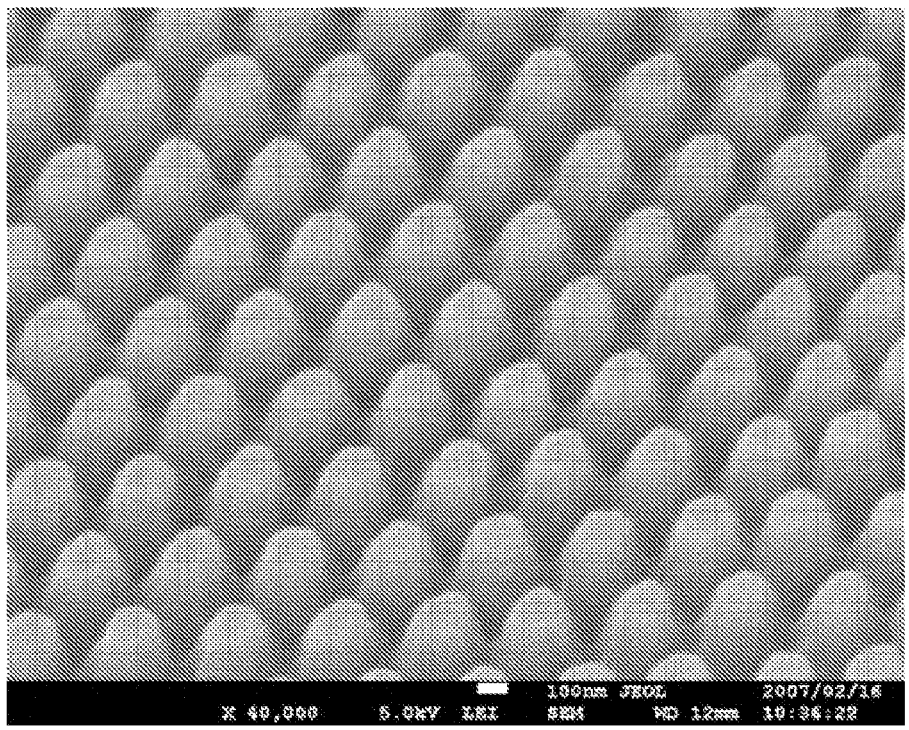
FIG. 8 is a SEM photograph of one principal surface of a duplicate substrate according to Example 2.
Figure 9:
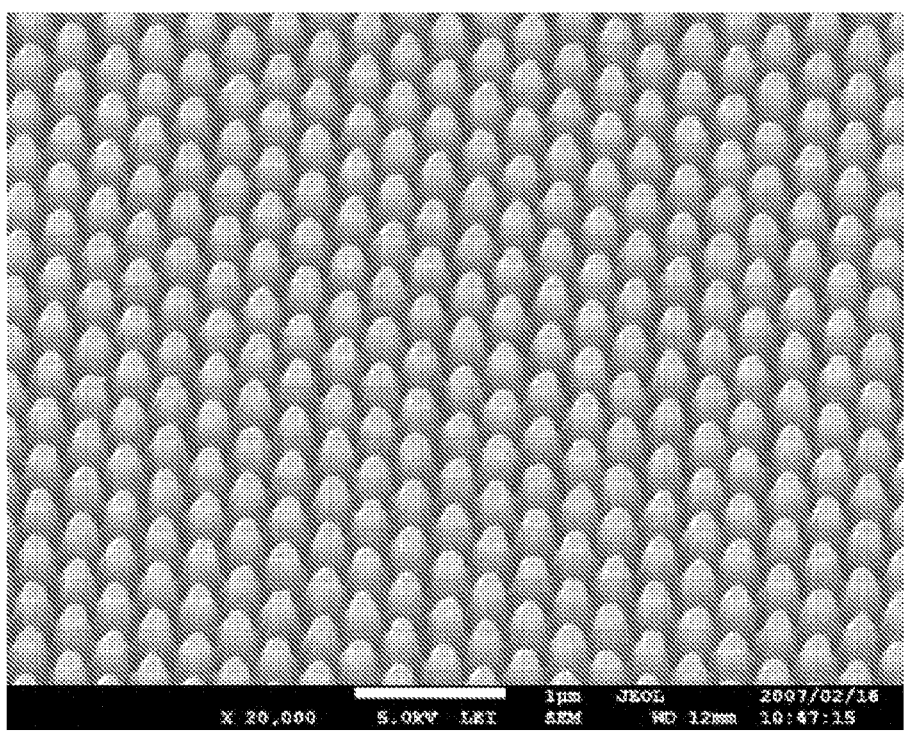
FIG. 9 is a SEM photograph of one principal surface of a duplicate substrate according to Example 5.

The following are cleat from FIG. 8 and FIG. 9.

A plurality of convex structures are arranged on the duplicate substrate in such a way as to constitute a quasi-hexagonal lattice pattern. The structure is in the shape of an elliptical cone in which the slope of the top portion is gentle and the slope becomes sharp from the middle portion toward the bottom portion gradually, that is, the shape of a so-called temple bell. The structure in such a shape can be obtained by gradually increasing the etching time in the order of top portion, the middle portion, and the bottom portion in the master etching step.

Evaluation of Reflection Characteristic

Figure 10:
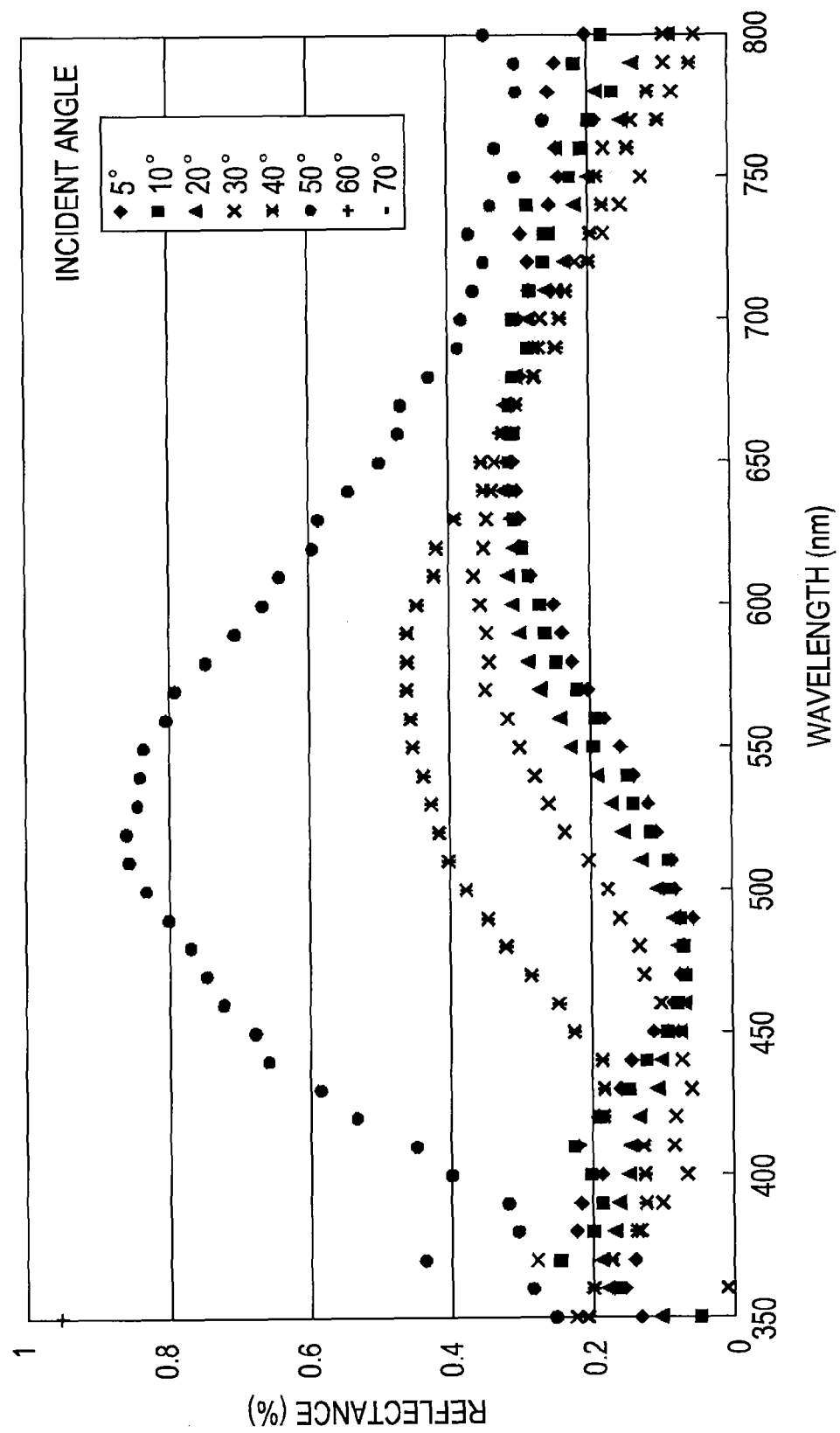
FIG. 10 is a graph showing the reflection characteristic of the duplicate substrate according to Example 2.
Figure 11:
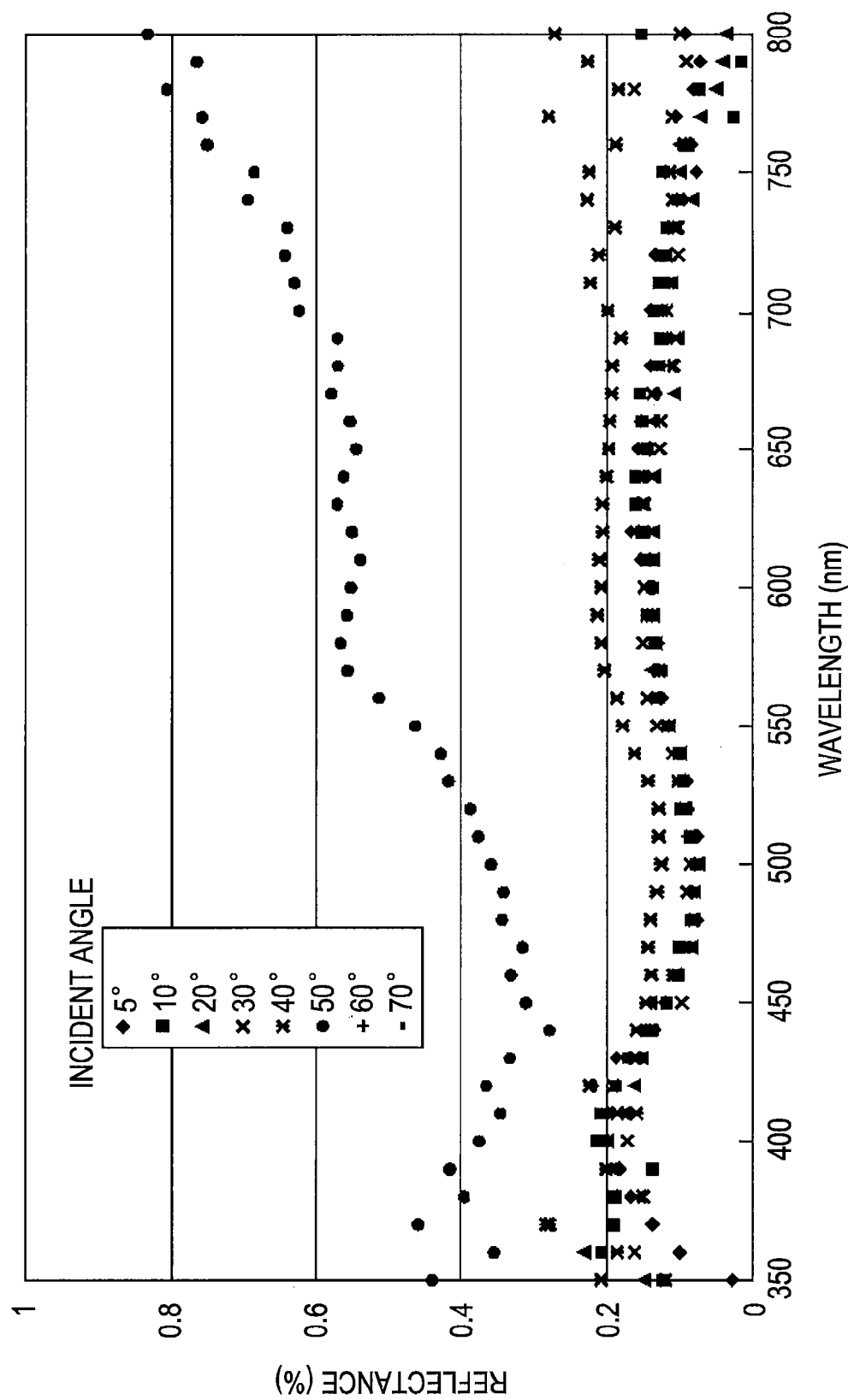
FIG. 11 is a graph showing the reflection characteristic of a duplicate substrate according to Example 3.
Figure 12:
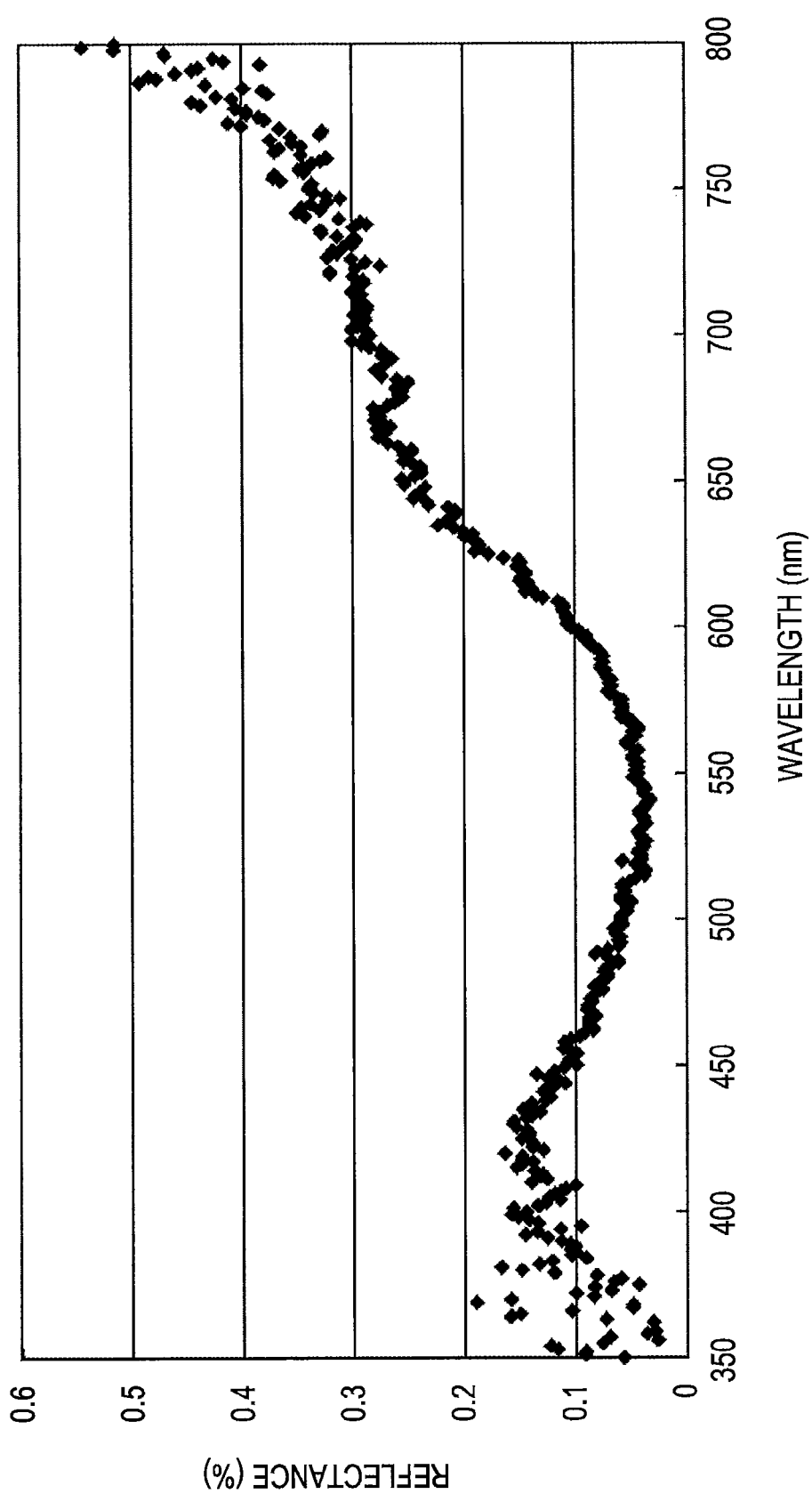
FIG. 12 is a graph showing the reflection characteristic of a duplicate substrate according to Example 4.
Figure 13:
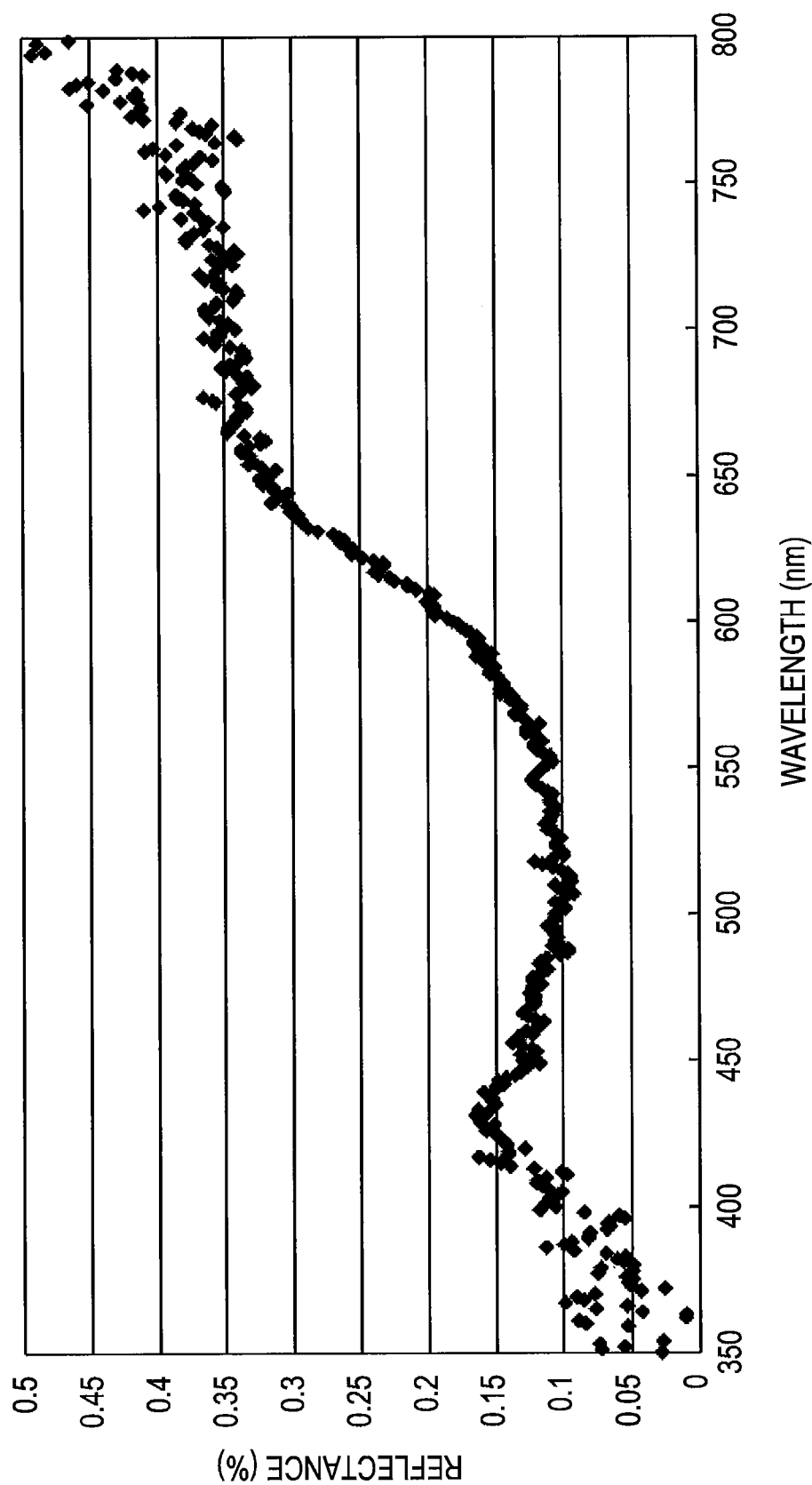
FIG. 13 is a graph showing the reflection characteristic of the duplicate substrate according to Example 5.

The reflectances of the thus produced duplicate substrates of Examples 2 to 5 were measured. The measurement results thereof are shown in FIG. 10 to FIG. 13. FIG. 10 and FIG. 11 show the reflectances with respect to the light which enters at incident angles of 5° to 70°. FIG. 12 and FIG. 13 show the reflectances with respect to the light which enters at an incident angle of 5°. UV/VIS Spectrophotometer (trade name: V-500, produced by JASCO Corporation) was used for the measurement.

Figure 20:
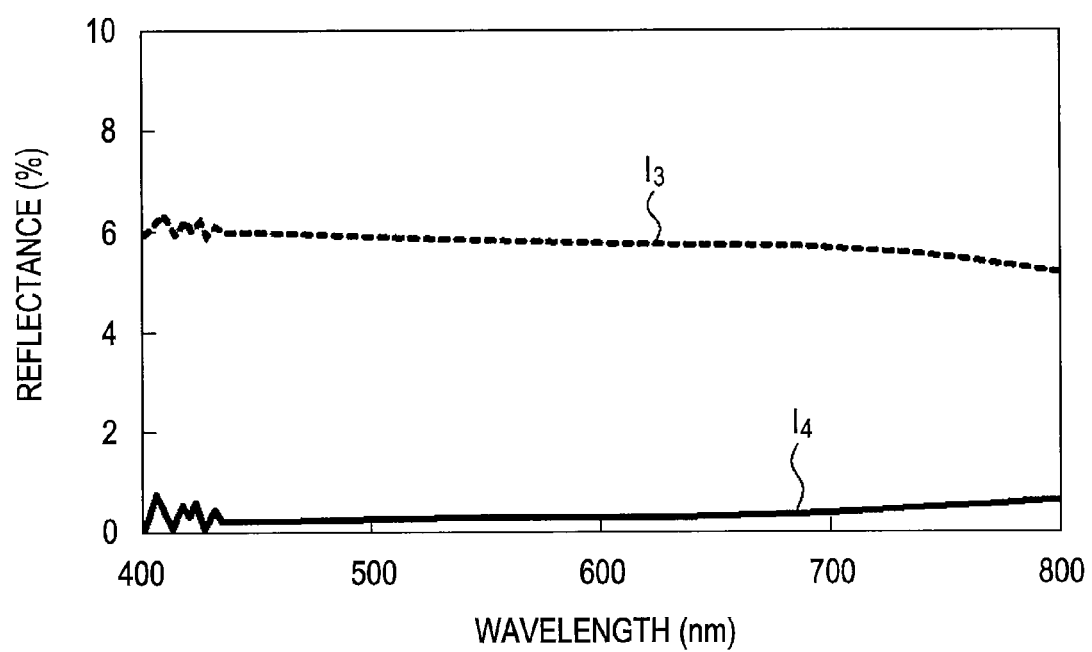
FIG. 20 is a graph showing the relationship between the wavelength and the reflectance of an optical element in related art.

As shown in FIG. 10, the reflectance of the duplicate substrate of Example 2 has a wavelength dependence characteristic, and the reflectance is indicated by the shape of a sign wave with small amplitude. However, such wavelength dependence causes almost no problem in practice. Furthermore, as described later, according to the result of the RWCA simulation on the optical element having temple bell type elliptical cone-shaped structures, it is ascertained that the reflectance exhibits wavelength dependence and is indicated by a sine wave with small amplitude, although the reflectance does not increase in a long wavelength region. Regarding the optical element disclosed in the above-described non-patent document, the structures are in the shape of tents and, therefore, there is a problem in that the reflectance increases in a long wavelength range (700 to 800 nm), as shown in FIG. 20. The average reflectance of the duplicate substrate of Example 2 is 0.2% or less and, therefore, a characteristic better than the nonreflective effect (reflectance of 0.3% or less) of the duplicate substrate disclosed in the non-patent document is obtained. Moreover, the angular dependence is also at a low level and very good incident angle characteristic is exhibited, wherein the average reflectance is 0.3% or less at an incident angle of up to ±40 degrees and the average reflectance is 0.6% at an incident angle of ±50 degrees.

As shown in FIG. 11, the reflectance of the duplicate substrate of Example 3 has a wavelength dependence characteristic, and the reflectance is indicated by the shape of a sign wave with small amplitude. However, the average reflectance is 0.15% or less and, therefore, a characteristic better than that of Example 2 is exhibited. The angular dependence is also at a low level and very good incident angle characteristic is exhibited, wherein the average reflectance is 0.20% or less at an incident angle of up to ±40 degrees and the average reflectance is 0.5% at an incident angle of ±50 degrees.

As shown in FIG. 12, the reflectance of the duplicate substrate of Example 4 has a wavelength dependence characteristic to some extent. However, an excellent antireflection characteristic is obtained. In particular, an excellent antireflection characteristic with respect to blue light and green light is exhibited, and the reflectances with respect to these lights are reduced to about 0.1.

As shown in FIG. 13, the reflectance of the duplicate substrate of Example 5 has a wavelength dependence characteristic to some extent. However, an excellent antireflection characteristic is obtained. In particular, an excellent antireflection characteristic with respect to blue light and green light is exhibited, and the reflectances with respect to these lights are reduced to about 0.1. Furthermore, since the pitch P is a large 660 nm and the aspect ratio H/P is a small 0.64, duplication is easily conducted and, therefore, suitability for production is high.

The duplicate substrates of Examples 3 to 5 have particularly excellent nonreflective characteristics in the visible light region (wavelength of 350 to 800 nm) and are applicable to many application goods, e.g., illumination apparatuses and protective windows, besides displays.

Consequently, in order to obtain excellent nonreflective performance, it is preferable that the pitch P of the structures of the quasi-hexagonal lattice pattern is specified to be 380 nm to 680 nm and the aspect ratio (height H/pitch P) of the structure is specified to be 0.62 to 1.09. It is more preferable that the pitch P of the structures of the quasi-hexagonal lattice pattern is specified to be 400 nm to 650 nm and the aspect ratio (height H/pitch P) of the structure is specified to be 0.65 to 1.03. Alternatively, the aspect ratio of the structure is specified to be 0.64 to 0.75, based on Examples 4 and 5.

In the description of the present embodiment, the structure is in the shape of an elliptical cone in which the slope of the top portion is gentle and the slope becomes sharp from the middle portion toward the bottom portion gradually, that is, the shape of a so-called temple bell. However, an elliptical cone shape formed in such a way that the slope of the middle portion is sharper than the slopes of the top portion and the bottom portion can obtain substantially the same nonreflective characteristic. Furthermore, convex elliptical cones constituting the shape of a quasi-hexagonal lattice or convex elliptical cones or elliptical truncated cones constituting the shape of a hexagonal lattice can obtain substantially the same nonreflective characteristic.

In Test example 1, the relationship between the depth of the structure and the reflectance was studied on the basis of a rigorous coupled wave analysis (RCWA) simulation.

Test Example 1

Figure 14:
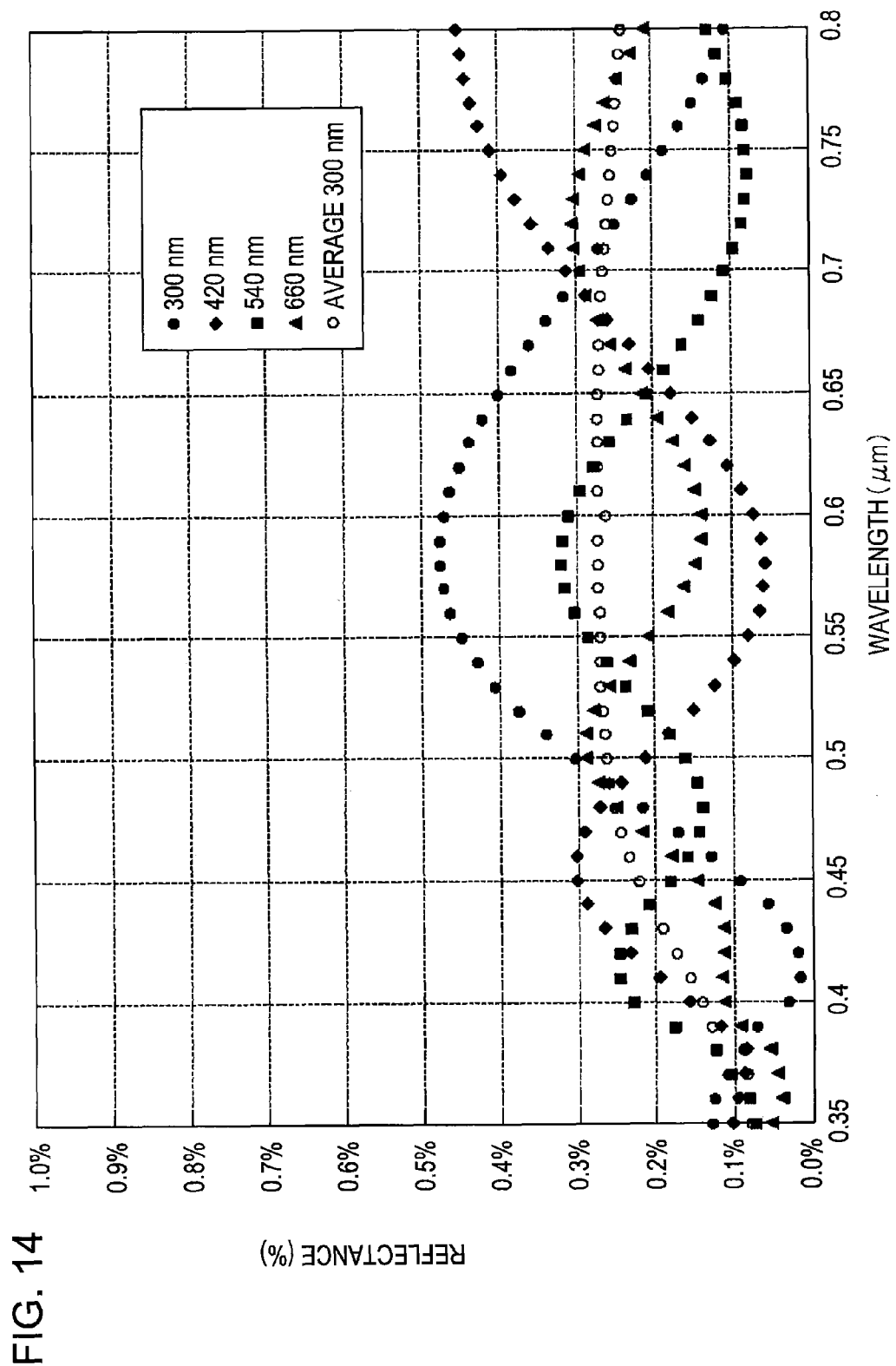
FIG. 14 is a graph showing the reflection characteristic of an optical element according to Test example 1.

The RCWA simulation was conducted while the height of the structure was changed within the range of 300 nm to 660 nm. The results thereof are shown in FIG. 14. The shape of the structure was specified to be a temple bell type, and the arrangement of the structures was allowed to take the shape of a hexagonal lattice.

As is clear from FIG. 14, it is difficult to reduce the reflectance to 0.10% even when the height of the structure is changed within the range of 300 nm to 660 nm.

In Test example 2, the relationship between the arrangement pitch of the structures and the reflectance was studied on the basis of the rigorous coupled wave analysis (RCWA) simulation.

Test Example 2

The RCWA simulation was conducted while the height H of the structure was constant 420 nm and the arrangement pitch was changed within the range of 200 nm to 650 nm. The results thereof are shown in FIG. 15.

Figure 15:
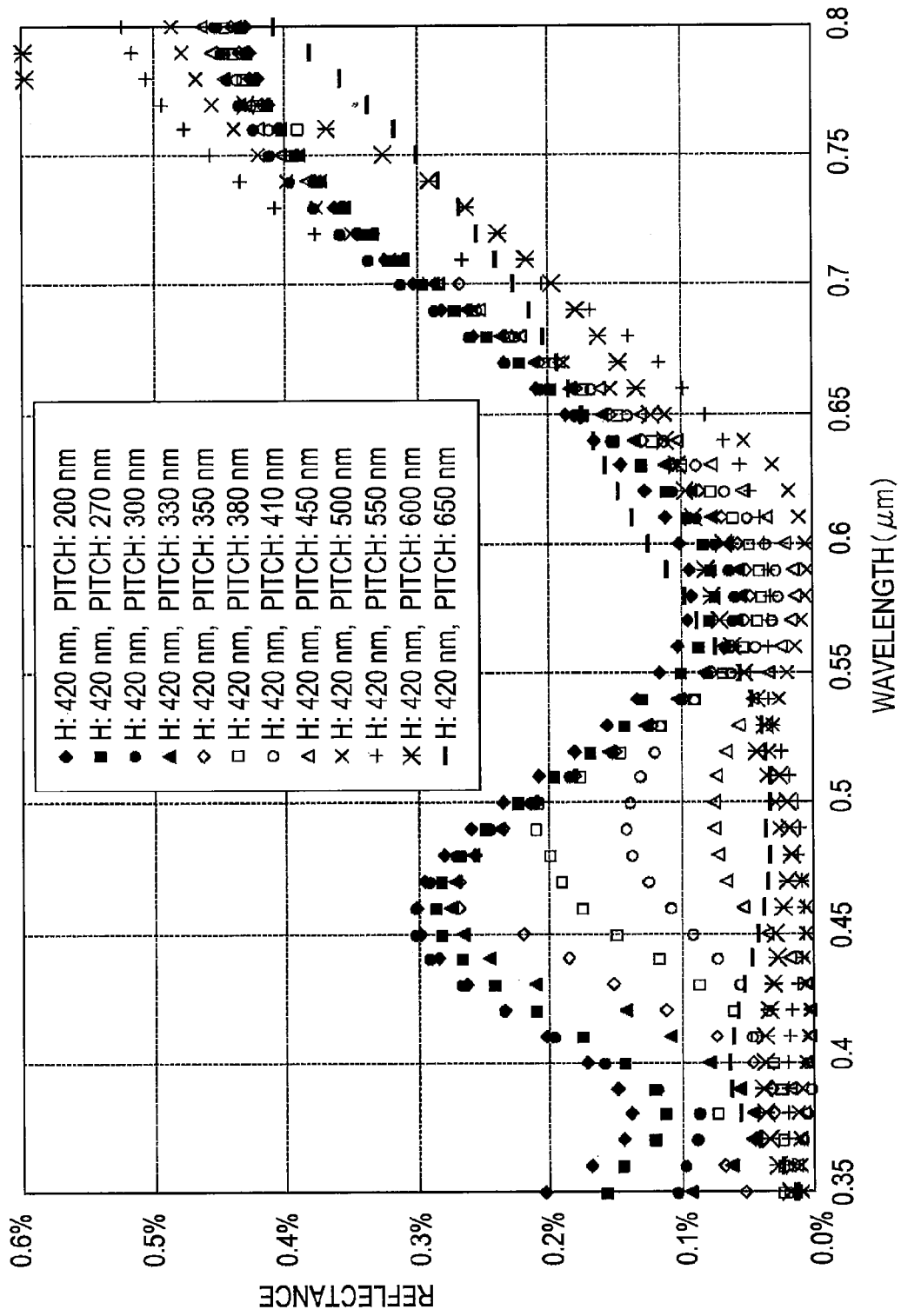
FIG. 15 is a graph showing the reflection characteristic of an optical element according to Test example 2.

As is clear from FIG. 15, it is possible to reduce the reflectance to 0.10% or less by increasing the arrangement pitch of the structures.

Up to this point the embodiments and the examples of the present application have been specifically described. However, the present application is not limited to the above-described embodiments and examples, and various modifications can be made on the basis of the technical idea of the present application.

For example, the numerical values mentioned in the above-described embodiments and examples are no more than exemplifications, and numerical values different from them may be employed as necessary.

In the above-described embodiments and examples, the case where the structures are arranged in such a way as to constitute a plurality of arc-shaped tracks and constitute a quasi-hexagonal lattice pattern in adjacent three tracks is explained as an example. However, the structures may be arranged on a plurality of straight lines in such a way as to constitute a hexagonal lattice in adjacent three lines.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element comprising:
a plurality of structures including convex portions or concave portions arranged on a base member surface and having an anti-reflection property, wherein:
the structures are arranged to constitute a quasi-hexagonal lattice pattern having a plurality of tracks on the base member surface,
a first arrangement pitch of the structures in the same track is larger than a second arrangement pitch of the structures between adjacent two tracks,
each arrangement pitch of all structures is between 380 nm to 680 nm, and
an aspect ratio of all structures is 0.64 to 0.75, wherein the aspect ratio is defined by a height (H) of one structure and an arrangement pitch (P) between one structure and an adjacent structure, and calculated based on equation 1 as follows:

$$\text{aspect ratio} = H/P \qquad \text{(equation 1)}.$$

2. The optical element according to claim 1, wherein the structures are arranged to constitute a plurality of arc-shaped tracks.

3. The optical element according to claim 2, wherein the structures are in the shape of an elliptical cone or the shape of an elliptical truncated cone, in which a direction of a major axis is a circumferential direction of the plurality of arc-shaped tracks.

4. The optical element according to claim 3, wherein regarding the shape of an elliptical cone or the shape of an elliptical truncated cone, the slope of the top portion is gentle and the slope becomes sharp from the middle portion toward the bottom portion gradually.

5. The optical element according to claim 2, wherein the height or a depth of the structures in a circumferential direction of an arc-shaped track is smaller than the height or the depth of the structures in a radius direction of the arc-shaped track.

6. The optical element according to claim 1, wherein the aspect ratio of the structures is 0.65 to 0.75.

7. The optical element according to claim 1, wherein each arrangement pitch of the structures is between 400 nm to 650 nm.

8. The optical element according to claim 1, wherein a difference between the first arrangement pitch of structures in a first track and the second arrangement pitch of structures in adjacent tracks is 30 nm.

9. A method for manufacturing a master for producing an optical element in which a plurality of structures including convex portions or concave portions are arranged on a substrate surface, the method comprising:
preparing a substrate provided with a resist layer on a surface;
forming a latent image by applying laser light to the resist layer intermittently while the substrate is rotated and the laser light is moved relatively in a direction of the rotation radius of the substrate;
forming a resist pattern on the surface of the substrate by developing the resist layer;
forming concave and convex structures on the surface of the substrate by conducting an etching treatment while the resist pattern is used as a mask;
the structures being arranged to constitute a quasi-hexagonal lattice pattern having a plurality of tracks on the surface;
a first arrangement pitch of the structures on a same track being larger than a second arrangement pitch of the structures between adjacent tracks, wherein:
in the forming of a latent image, the latent image is formed in such a way that each arrangement pitch of all structures is between 380 nm to 680 nm, and
in the forming concave and convex structures, the etching treatment is conducted such that an aspect ratio of all structures ranges from 0.64 to 0.75, wherein the aspect ratio is defined by a height (H) of one structure and an arrangement pitch (P) between adjacent structures, and calculated based on equation 1 as follows:

$$\text{aspect ratio} = H/P \qquad \text{(equation 1)}.$$

10. The method according to claim 9, wherein a difference between a first arrangement pitch of structures in a first track and the second arrangement pitch of structures in adjacent tracks is 30 nm.

* * * * *